United States Patent
Dherange et al.

(10) Patent No.: US 11,765,189 B2
(45) Date of Patent: Sep. 19, 2023

(54) BUILDING AND MAINTAINING CYBER SECURITY THREAT DETECTION MODELS

(71) Applicant: GURUCUL SOLUTIONS, LLC, El Segundo, CA (US)

(72) Inventors: Nilesh Dherange, El Segundo, CA (US); Saryu Nayyar, El Segundo, CA (US); Naveen Vijayaraghavan, El Segundo, CA (US)

(73) Assignee: GURUCUL SOLUTIONS, LLC, El Segundo, CA (US)

( * ) Notice: Subject to any disclaimer, the term of this patent is extended or adjusted under 35 U.S.C. 154(b) by 302 days.

(21) Appl. No.: 17/147,891

(22) Filed: Jan. 13, 2021

(65) Prior Publication Data

US 2022/0224702 A1 Jul. 14, 2022

(51) Int. Cl.
*H04L 9/40* (2022.01)
*G06N 5/04* (2023.01)
*G06F 16/25* (2019.01)
*G06N 20/00* (2019.01)
*G06F 16/22* (2019.01)

(52) U.S. Cl.
CPC ...... *H04L 63/1425* (2013.01); *G06F 16/2237* (2019.01); *G06F 16/258* (2019.01); *G06N 5/04* (2013.01); *G06N 20/00* (2019.01); *H04L 63/1416* (2013.01)

(58) Field of Classification Search
CPC ............ H04L 63/1425; H04L 63/1416; G06F 16/2237; G06F 16/258; G06N 20/00; G06N 5/04
See application file for complete search history.

(56) References Cited

U.S. PATENT DOCUMENTS

| | | | | |
|---|---|---|---|---|
| 11,012,448 | B2* | 5/2021 | Young | G06N 20/00 |
| 2016/0162779 | A1* | 6/2016 | Marcus | G06N 20/10 |
| | | | | 706/12 |
| 2018/0018463 | A1* | 1/2018 | Grossman | A63F 13/75 |
| 2020/0168338 | A1* | 5/2020 | Forsberg | G16H 40/63 |
| 2021/0075799 | A1* | 3/2021 | Pularikkal | H04L 63/105 |
| 2021/0110480 | A1* | 4/2021 | Kwak | G07C 5/008 |
| 2021/0152555 | A1* | 5/2021 | Djosic | H04L 63/1425 |
| 2021/0216928 | A1* | 7/2021 | O'Toole | G06F 16/287 |

* cited by examiner

*Primary Examiner* — Dereena T Cattungal
*Assistant Examiner* — Saad Ahmad Abdullah
(74) *Attorney, Agent, or Firm* — Perkins Coie LLP (57) ABSTRACT

Techniques for building and maintaining cyber security threat detection models are described. The techniques include data selection, algorithm selection, risk score algorithm selection, model outcome selection, and model automation. During data selection, data is received from various sources and in various formats. The data is then tokenized into vector form and compared to preexisting vectors. If the vectors are equal, the tokenized vector is saved in the database. If the vectors are not equal, a new vector, in key value pair format, is formed. After which, algorithms can be selected to detect anomalies within the data and assign a risk score to the data. Subsequently, a matrix is formed with the vector, selected algorithm, and parameters of the data that were analyzed. The matrix is then stored for application with future data based on a predetermined rule. The output can be modeled in various user-friendly methods.

20 Claims, 9 Drawing Sheets

| Type of telemetry/Applications | Examples |
|---|---|
| Human Resource Information | PeopleSoft, SAP, Work Day etc. |
| Authentication Events | IT Applications, Domain Controller, Server Logs i.e. Unix/Linux Auth logs, Single Signon Applications, Two Factor Authentication, Remote Access etc. |
| Big Data and Database | Oracle, MySQL, Microsoft SQL Server, Postgres, Hadoop, NoSQL databases etc. |
| Data Center | Server Logs, Virtualization Softwares such as Citrix and VMWare, CMDB |
| Document Repository | Office 365 SharePoint and OneDrive, Google Drive, Box, Drop Box etc. |
| Network Data | Proxy, Netflow, Firewall, VPN, DNS, DHCP, Routers and Switches, VOIP, SNMP, SMTP, FTP/SFP, Wifi, Network CMDB etc. |
| Cloud Infrastructure and Applications | Office 365 Suite, Google G Suite, AWS S3, AWS Cloud Trail, AWS Guard Duty, Azure Cloud, Google Cloud Platform etc. |
| Email and Messaging | Email Gateway applications, Office 365 Exchange, Skype, Microsoft Teams etc. |
| Process and System Monitoring | Sysmon, Operating System Event logs, Software Install/Uninstall, USB events, Scheduled Tasks etc. |
| Cyber Security Applications | DLP, SIEM, End point detection and response (EDR), IDS/IPS Alerts, Anti-Virus, Threat Intelligence, Dark Web etc. |
| Web and Public Information | Social Media Feeds, Web Scraping, Online Marketing Campaigns etc. |
| Physical Infrastructure | Card Reader and Badge Access, Point of Sale Systems, RFID/NFC/BLE etc. |
| IoT | Medical Devices, CCTV Camera, Thermostats etc. |

FIG. 4

| ML/Types | ML Techniques | Algorithms | Use Cases |
|---|---|---|---|
| Supervised Learning | Classification | ZeroR, OneR, Naive Bayes, Decision Tree | Network scanning and spoofing |
| Supervised Learning | Regression | Linear Regression, Support Vector Regression | Predict DDoS attack<br><br>Phishing Attack<br><br>APTs in Network |
| Unsupervised Learning | Partitioning Clustering | K-Means, K-Medoids | Dynamic Endpoint Behavior Changes<br><br>Fraud Detection and Cyber Profiling |
| Unsupervised Learning | Hierarchical Clustering | Single Linkage, Complete Linkage | Adversarial Behaviors<br><br>Adhoc network attacks<br><br>Insider Threat and Peer Grouping |
| Deep learning | Artificial Neural Network | Backpropogation | Steganography image detection. |
| Deep learning | Deep Neural Network | Multi-Layer Perception, Covolution Neural Network, Long-Short Term Memory | Malware traffic detection<br><br>Network Intrusion detection |

*FIG. 5*

| Outcome Type | Category | Examples |
|---|---|---|
| Data Visualization | Bar chart | Represent volume of bytes transferred by entity comparing the baseline and anomalous activity detected. |
| Data Visualization | Pie Chart | Represent web site categories visited by entity comparing the baseline and anomalous activity detected. |
| Incident Response | Case Creation | Create a case for the incident if the overall risk score of the entity is above certain threshold |
| Automation Action | Account Termination | Disable the account in AD/LDAP based on anomalous behavior detected |

BUILDING AND MAINTAINING CYBER SECURITY THREAT DETECTION MODELS

TECHNICAL FIELD

This patent document relates generally to security analytics in computer networks, and more specifically to creating a user interface in which to build advanced data science models.

BACKGROUND

With the increased proliferation of computer systems in all aspects of our lives, including health records, financial transactions and travel, cyber security is becoming an important issue. Threats to an establishment's computers and data privacy may come from many different sources and at any time.

Cyber security attacks are prevalent in different forms including a Virus, Malware, Advanced Persistent Threats (APTs), Ransomware, data theft, Vulnerability exploits, and many others. Attacks can be further classified as insider threats with non-intentional and intentional purposes, or external attacks which can be classified as external state sponsored attacks and external across with ban intent. Several large scale organizations have fallen prey to these and other cyber security attacks. In some cases, organization with matured Security Operations Centers (SOCs) have come under attack.

SOCs are generally supported by experienced human analysts who struggle to detect, prevent, and eliminate a cyber security attack. Further, to better secure themselves against cyber security attacks, organizations have begun to adopt machine learning and/or artificial intelligence (ML/AI) based algorithms. These algorithms can support the SOCs to analyze and identify patterns on anomalous behavior.

SUMMARY

The description herein relates to techniques to develop and maintain data science algorithms. Specifically, the techniques relate to building a tool which allows people of various skill levels to create and maintain data science based algorithms, which can be used to detect any unusual behavior performed by entities. The entities can include, for example, users, systems, and/or devices. The audience can include, for example, cyber security analysts, data science engineers, and/or information technology engineers.

In one example aspect, a method of creating a threat detection model is disclosed. The method includes determining, by a processor, raw data to be input into the threat detection model. The determining of raw data further comprises receiving the raw data; tokenizing the raw data into a raw data vector; comparing the raw data vector with a preexisting vector, wherein the preexisting vector includes previously identified patterns; and upon determining that the raw data vector is not equal to the preexisting vector, creating a new vector, based on the raw data vector, in a key value pair (KVP) format. The method further comprises applying, by the processor, a model configuration matrix to the new vector, the model configuration matrix including a vector representation of the threat detection model, the new vector, and a parameter vector; updating, by the processor, a risk profile based on an output from the applying of the model configuration matrix, wherein the output is indicative of similarities between the subsequent data vector and the new vector, and wherein the risk profile is directly related to the similarities; and scheduling, by the processor, reapplication of the model configuration matrix based on a predetermined rule.

In another example aspect, a computing device that includes a processor is disclosed. The computing device implements the above-described method.

In yet another example aspect, a computer-readable medium having code stored on is disclosed. The code, upon execution by a processor, causes the process to implement a method described herein.

These, and other, aspects are described through out the document.

DETAILED DESCRIPTION

In order to support data-driven cybersecurity solutions, organizations hire data scientists to build and maintain machine learning (ML) and/or artificial intelligence (AI) algorithms. Data scientists work closely with subject matter experts to analyze a wide range of telemetry and event logs, such as data generated from standard industry applications, home grown solutions, Internet of Things (IoT), and alerts from other cybersecurity products. By doing so, data scientists can build algorithms to support various security related use cases.

Data scientists can use standard programming language tools and libraries to build data models and present the outcome of the findings to analysts for additional feedback and model-fine-tuning exercises. Through this life cycle, data scientists perform the difficult task of analyzing complex, heterogenous, highly cardinal, and large volume data sets to develop algorithms and data models in order to present the outcomes of the models. The presentations can occur through visual means such as summary tables to help reduce further analysis, increase understanding, and to help in the decision making process of detecting cybersecurity incidents and threats.

Further, building and maintaining data science algorithms is often challenging. Organizations leverage different technologies to process and store data. The lack of homogeneity leads to, for example, data being available in different formats and data scientists having to modify the logic to access the data across different platforms. This also leads to further issues such as poor data quality and lack of data integrity, which, in the end, impacts the efficacy of the model.

To address such issues, data scientists can leverage tools. The tools are, generally, standalone software programming languages and libraries. Further, the tools require steep learning curves and specific skills such as coding experience that relates to the tool. Moreover, data scientists tend to customize algorithms and/or use publicly available work done by other organizations. These algorithms also go through multiple revisions to enhance the results. Thus, automating and delivering the results of data science models, which detect anomalous behavior patterns, is difficult because standalone models have to be integrated with various third party and external tools to arrive at an outcome.

Further, maintaining a central repository to support development and maintenance of data science models is not simple. This is due to the fact that rapid development of new use cases is required as cybersecurity threats are constantly changing. Thus, relying solely on data scientists to keep up with the rapidly changing environment is not a feasible solution.

Accordingly, a new process for building new models is required. In particular, there is a need for an intuitive user experience with a step-by-step process which explains the lifecycle of building and maintaining a new model using a Graphical User Interface (GUI). The use experience can be, for example, vendor and data format agnostic to support reuse of the models built across different platforms. The user experience may help more than just data scientists; for example, SOC teams with analysts without data science or coding skills can contribute to the building of ML/AI models. By doing so, they can complement the data science teams so that the data science teams focus their skills on building more sophisticated models, and in general, help the development of an operational model for faster deployment.

Overview of Model Creation

As an initial matter, the data that is to be used to build a model has to be selected. For example, the data can be from raw data sources such as telemetry or event logs from different applications. Once the data is received by a system, the system can, in some embodiments, tokenize the data into one or more vectors (e.g., vector $\vec{A}$). The created vector(s) can then be compared against a preexisting vector database with identified patterns of previously seen or known vectors (e.g., vector $\vec{V}$). If the created vector and a preexisting vector are equal (e.g., vector $\vec{A}=\vec{V}$), then the system determines that the new vector is similar to a previously known vector and no additional processing is required. The new vector can be stored as a key-value pair (KVP) in a memory location such as an event store. If the two vectors are not similar (e.g., vector $\vec{A} \neq \vec{V}$), the system can then create a new vector (e.g., vector $\vec{X}$). The newly created vector can then be stored as a KVP in the event store and the preexisting database can be updated. By doing so, another anomaly is stored for future comparisons.

In some embodiments, subsequent to data selection, a model can be created to analyze the data. As mentioned above, data selection can include receiving raw data (e.g., telemetry, event data, and/or logs) from a source application. Further, the raw data can be available in the desired format or can be converted from one format to the desired format. Once the raw data is in a desired format, the system can perform data analytics. The format of the data can be, for example, a KVP vector. Each key within the KVP can be in the form of $K(V_1, V_2, V_3, \ldots V_n)$. During the data selection process, one or more of the keys can be selected to create the model. The model can be in vector form, such as $M(K_1, K_2, K_3, \ldots K_n)$.

After the data is selected, the system can allow a user to select of one or more algorithms to create data science models. In some embodiments, the algorithms can be represented in vector form (e.g., $D_n(A_1, A_2 \ldots A_n)$). Further, the system can allow for parameter selection. A parameter is information that the system uses to initialize a model and can be represented in vector form (e.g., $p_1, p_2, p_3, \ldots p_n$). Subsequently, the system creates a model configuration matrix which includes vector representations of the selected data, algorithms, and parameters.

In some embodiments, the data can then be parsed through risk scoring algorithms. The risk scoring algorithms help create risk profiles of the patterns detected during the data selection process and other processes. The risk scoring algorithms can be represented as a vector (e.g., $R(r_{a1}, r_{a2} \ldots r_{an})$).

The risk scores can be scaled with a scaling factor using normalization techniques with an upper and lower limit. The outcome for the previous processes can be modeled (e.g., Mo) in various ways. For example, the outcome type can be represented as a vector (e.g., $O_1, O_2, O_3 \ldots O_n$)). In some embodiments, various parameters (e.g., $O(P_1, P_2, P_3 \ldots P_n)$) of the outcomes can be used to further represent the outcomes.

Once the outcome is represented by a model, the system can be automated to detect threats at a later time. For example, automation can include reapplication of the model to data received during intervals of predetermined time periods. For instance, the frequency of reapplication can be represented by vector $T(t_1, t_2, t_n)$ and the automation of the model, Ma.

Model Creation Life Cycle

Figure 1:
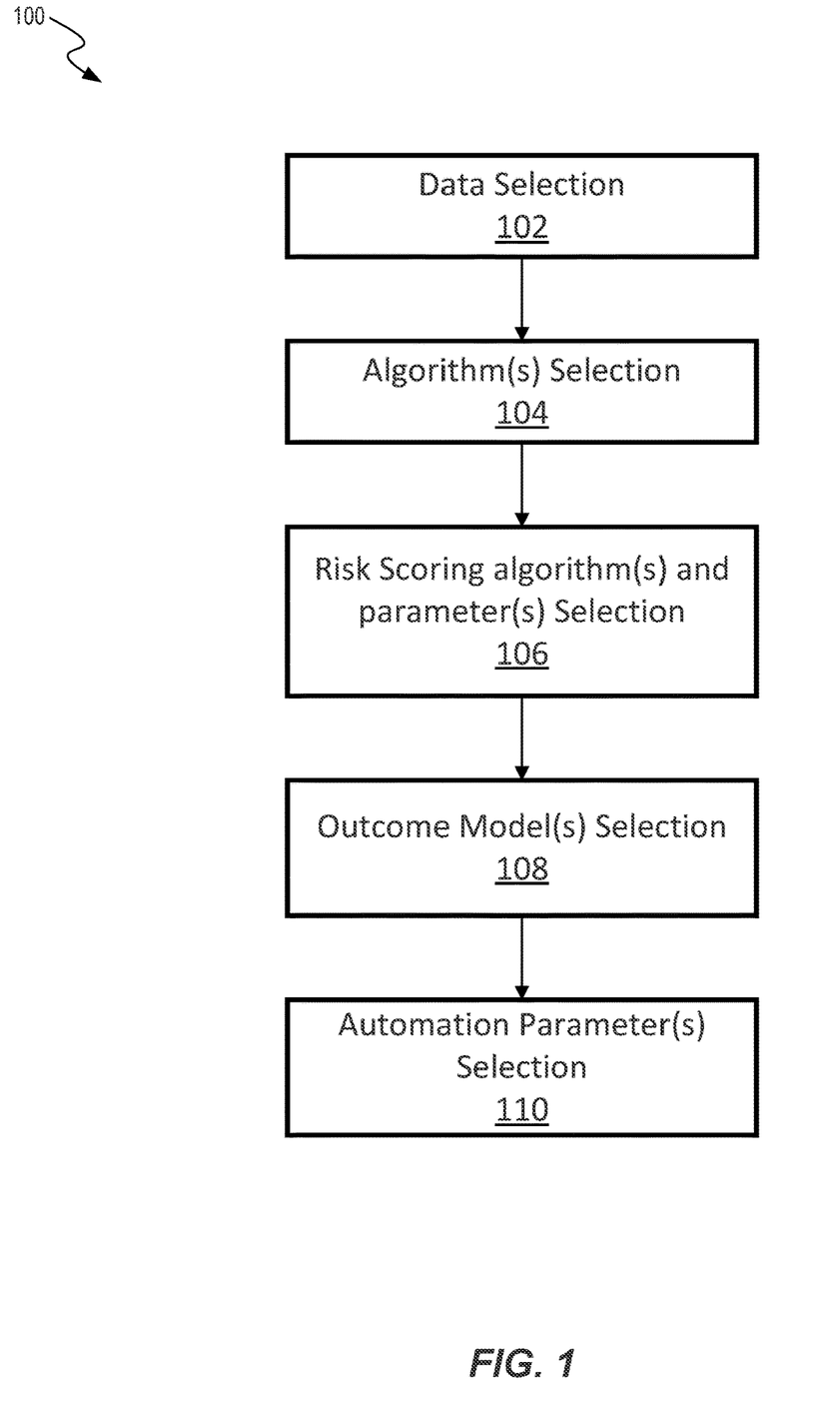
FIG. 1 depicts a flowchart of an exemplary method for a model creation life cycle.

FIG. 1 depicts a flowchart of an exemplary method for a model creation life cycle 100. Life cycle 100 can be employed to detect anomalous behavior perform by numerous entities. For the purposes of this disclosure, entities can include any categorical data that is used by a system to perform data analytics. For example, entities can include a device, user, machine, and/or a network. Further, the data used in life cycle 100 can include any telemetry information such as network sensors, network routers, network packet captures, IoT devices, and/or event logs generated by applications such as cloud applications, operating systems, and/or other software applications. Applications can also include alerts and/or alarms generated by cybersecurity alerting tools such as data loss prevention (DLP), Security Incident and Event Management (SIEM) tools, and/or intrusion detection systems or intrusion preventions systems (IDS/IPS).

In some embodiments, a system, by implementing life cycle 100, can provide a guided step-by-step process to create data science models. The system can provide the process with a graphical user interface (GUI). The GUI can be configured to display multiple screens in succession based on, for example, a selection of the user in a previous screen, as a consequence of a user-selection in a previous screen, and/or as a consequence of inputs (e.g., telemetry data). The life cycle 100 includes data selection 102, algorithm(s) selection 104, risk scoring algorithm(s) and parameter(s) selection 106, outcome model selection 108, and automation parameter(s) selection 110. The data selection 102 process is further described, in addition to the description above, in relation to FIG. 2.

Algorithm(s) selection 104 involves selecting an algorithm based on, for example, the one or more features extracted from raw data. The one or more features can be used as an input to create a model which is represented as, for example, $M_n(K_1, K_2, K_3 \ldots K_n)$. During algorithm(s) selection 104, the system allows selection of one or more algorithms to create a data science model(s), which can be represented in the form of vector $D_n(A_1, A_2 \ldots A_n)$. The features can include a designation for the raw data. For instance, data indicative of the data can include a feature that is labeled as "date".

Different algorithm(s) can be selected during algorithm(s) selection 104. For example, the three main categories of ML/AI based techniques include supervised, unsupervised, and deep learning/neural network. These techniques are commonly applied during development of different cyber security models. A commonality amongst the many techniques is that the algorithms require selection of features to develop a use case. Thus, during algorithm(s) selection 104, the system can provide options to input one or more features as parameters represented by, for example, (p1, p2, p3 . . . . pn) to be input to a model.

For instance, if a user wants to develop a model to detect fraud within an email server, the user may select IP addresses as a feature. Thus, the model can analyze IP addresses to determine which ones are abnormal for the particular email server. The analysis can be based on, for example, a data set representative of the previous IP addresses which has interacted with the email server and the frequency of those interactions.

The system can also input feature values as filter parameters so as to help restrict the data during analysis or filter data to exclude certain data from analysis. In other words, a user can limit the analysis to only the selected parameters. Using these inputs, the system can create a model configuration matrix with the vector representation of features and feature data selected as input. The inputs can be, for example, represented as vector $\vec{K}$, model $\vec{M}$, and model parameters $\vec{P}$:

$$D_{k,m,p} = \begin{pmatrix} d_{1,2,3} & d_{1,2,2} & \ldots & d_{1,m,p} \\ d_{2,1,3} & d_{2,2,2} & \ldots & d_{2,m,p} \\ \vdots & \vdots & \ddots & \vdots \\ d_{k,1,1} & d_{k,2,2} & \ldots & d_{k,m,p} \end{pmatrix}$$

During risk scoring algorithm(s) and parameter(s) selection 106, the system allows a user to select of one or more risk scoring algorithms. In general, analyzing an outcome from a single model may not necessarily lead to successful cyber threat detection. Thus, it can be crucial, in some embodiments, to select risk scoring algorithms based on context. For example, the risk scoring algorithms can vary based on the outcomes from different ML/AI techniques. For instance, one risk scoring algorithm may apply a first set rules to designate a risk score, while another risk scoring algorithm may apply a second set of rules, which are harsher than the first. The first set may have a threshold deviation of 20% from a baseline, while the second set has a threshold deviation of 2%. Thus, the risk scores from both the risk scoring algorithms may drastically differ. Thus, based on the context in which the model is applied, the user can select the appropriate risk scoring algorithm. In some cases, the GUI may suggest risk scoring algorithms based on the context (e.g., amount of data, ML/AI algorithm, and/or use case).

In some embodiments, the risk scoring algorithms can be represented as, for example, vector $R(r_{a1}, r_{a2}, r_{a3} \ldots r_{an})$. For instance, the risk scoring vector can be a combination of supervised, unsupervised, and deal learning models. As an example, a user can log into a machine, for the first time, at 9 AM on Monday. The data indicative of this act by the user can be scored as a risk ten out of ten. As the user continues to log in at 9 AM every day, the risk score can gradually move from ten, to nine, to eight, and so on. In other words, the risk can gradually decrease with consistent behavior. This occurs because as the system stored the data of the initial log-on, and thus, compares subsequent log-on data to the initial log-on. Eventually, the system can have a set including multiple data representative of log-on activity at 9 AM. Thus, with each new data set that resembles previous data sets, the risk score decreases. However, if the logs in at midnight, this act can be associated with a high risk score because this is anomalous behavior for the user.

To continue the example, the system can also account for the user's other activity on the machine. For example, the system can account for the applications that are normally accessed, files that are worked on, people that are contacted (e.g., emailed), the activity of others on the network, and/or activity of others in the vicinity (e.g., in an office building). Using this data, the system can analyze the user's behavior to determine the riskiness of the user's behavior. Thus, in some embodiments, the system can create a behavior profile for entities (e.g., users) over a period. The development of behavior profiles, in addition to the risk scores, can help in detection anomalous behavior during periodic or real-time analysis.

The risk scores can be dependent on which ML/AI techniques were used using the other processes. Different ML/AI techniques may require different risk scoring algorithms. Common risk scoring algorithms that can be selected during risk scoring algorithm(s) and parameter(s) selection 106 include, for example, population based risk scoring, percentage based risk scoring, risk decay, and risk profiling. These algorithms can vary in effectiveness based on the threat. For instance, to detect a data exfiltration attempt over multiple days, best practices suggest avoiding risk score decaying techniques. In another example, when analyzing the behavior of entities with privileges access, best practice suggests using risk decaying techniques. As mentioned above, a knowledgeable user can select an appropriate risk scoring algorithm within the GUI; however, the GUI can also provide recommendations based on the activity in the previous steps.

The variety of behaviors that the system may need to analyze is a reason why selecting multiple risk algorithms to create risk profiles for the anomalous behavior detected by the ML/AI models can be effective. Thus, the model can be built using multiple algorithms having different risk scores. The risk score can then be normalized by applying risk normalization techniques. For example, a scaling factor can include a minimum risk (renin) and a maximum risk ($r_{max}$). The scaling factor can be scaled between 1 and 100, where 100 indicates highest level of risk. The risk scoring and the outcome of the risk scoring can be represented using the function below:

$$R_{min,max} = \sum_0^n N(f(r_{a1}, r_{a2} \ldots r_{an})) \tag{1}$$

During outcome model(s) selection 108, the system allows for selection of one or more model outcomes represented by, for example, vector ($O_1, O_2, O_3 \ldots O_n$). Model outcomes can include, for example, data visualization, incident response actions, and/or security orchestration, automation, and response (SOAR). Data visualization, for example, allows for easy interpretation of trends and patterns. This can be especially useful in cyber security because of the volume of data and the need to represent the data in a digestible format. Importantly, the data can be summarized and represented in a way to allow an analyst, for example, to interpret the results from a large data set quickly and without being overwhelmed.

In some embodiments, multiple visualization modes can be selected. Doing so can be helpful because ML/AI models can require multiple features, which cannot always be represented in a single visualization model. In some embodiments, the system can create an outcome model based on criteria such as, for example, risk score thresholds. An outcome model can also include a workflow process (e.g., triage process) that eventually alerts a response team. For example, in a security orchestration and automation model, the system can automatically apply pre-built workflows for common issues.

The model selected during outcome model(s) selection 108 can be represented by the following function where p is parameter that the ML/AI techniques used:

$$M_o = f(o_{i,p})$$

For example, a user can be building an outcome model to present to a group that isn't knowledgeable about data science. However, the user may need to present data indicative of an insider threat. The insider threat may be transferring data from internal network to personal storage devices, which is against the business policy. To do so, the user can, for example, present the percentage of data that is transferred per day at the business in a pie chart. The pie chart can include portions (e.g., slices) that represents the amount transferred by the potential insider threat. The group can, due to the visual representation, determine whether the insider threat is malicious or not. Further, the user can determine the features of the data to present. For instance, the rate at which data is transferred, the location within the network that the data is transferred, and/or other features of the data transfer.

During automation parameter(s) selection 110, the system executes the model in the background such that the model is automatically reapplied to data based on a predetermined rule. The system can, for example, schedule reapplication of the model in an interval of second, minutes, hours, days, weeks, and/or in real-time. By scheduling reapplication, the system is able to compound the baseline data with subsequent data to determine anomalous behavior. In the example where the user logs into a machine at 9 AM, for example, the compounding of data every day helps the system associate a low risk with the behavior. In some embodiments, the data can be analyzed in batches and/or in real-time. In other words, the system can pull data from a source periodically and in batches. The model triggering frequency time can be represented as, for example, $T(t_1, t_2, t_n)$. The method used by the system to automate the models by taking model artifacts (e.g., features) as a parameter is shown in the function below:

$$M_a = f(t_i | rta_{s|m}) \quad (2)$$

Data Selection

Figure 2:
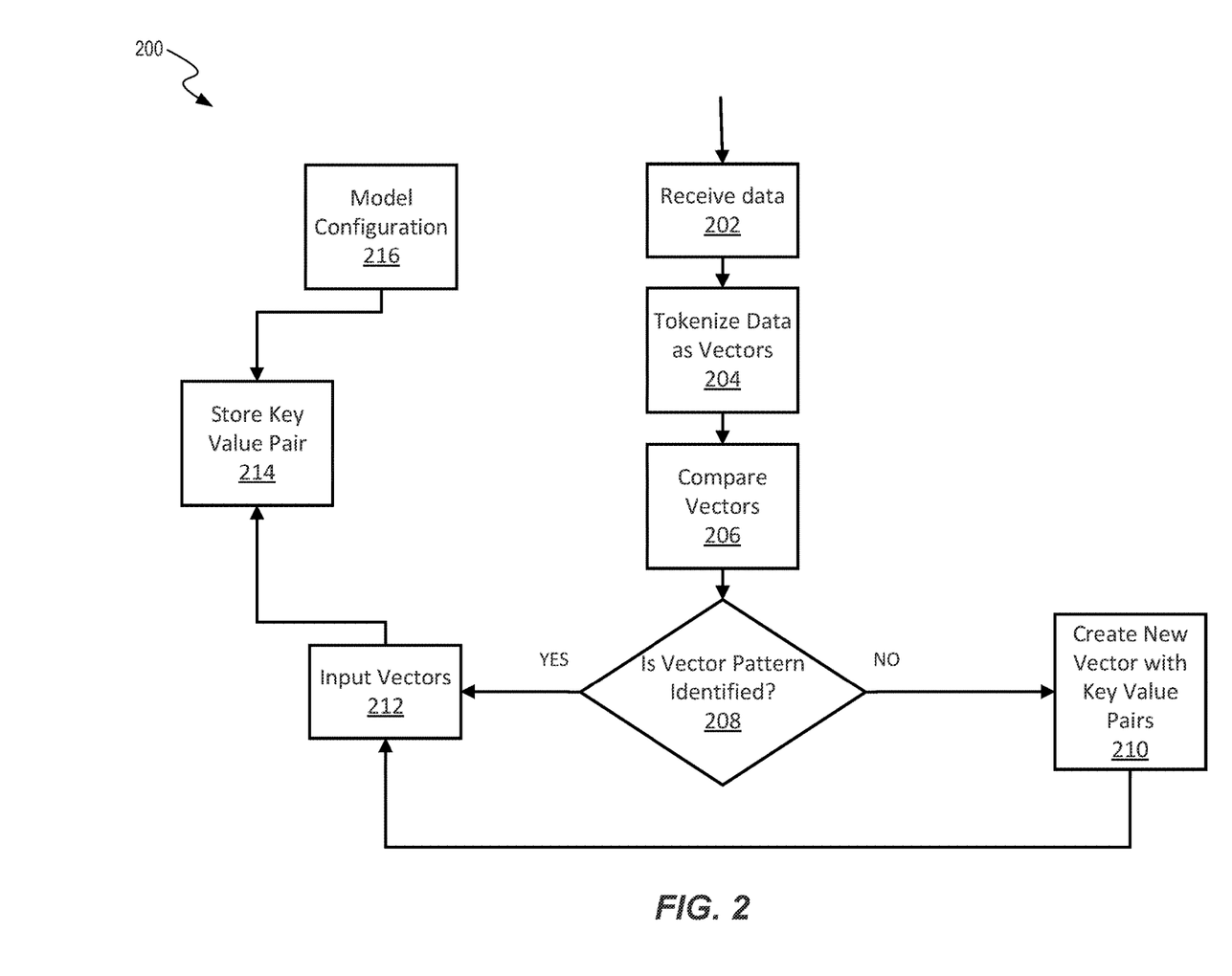
FIG. 2 depicts a flowchart of an exemplary method for data selection.

FIG. 2 depicts a flowchart 200 of an exemplary method for data selection. Flowchart 200 provides the details of data selection 102 in FIG. 1. At block 202, data can be input into the system from various sources. The sources can be, for example, cyber security systems and/or IT applications. Further, the received data can be in different formats such as comma delimited, network packet captures, json, and/or xml. In some embodiments, the data (e.g., event logs from applications) can include different data structures that can be classified as features. The features can be retained for further analysis during the anomaly detection process.

At block 204, the system can tokenize the data as vectors containing KVPs. For a given key, one or more values can be stored in vector form. For example, $K(V_1, V_2, V_3 \ldots V_n)$. At block 206, the tokenized vector is compared with vectors within a preexisting database on vectors. The vectors within the preexisting database can include previously seen or known vectors. At block 208, the system performs a vector comparison to determine if the vector is identifiable based on prior observations. In some embodiments, this step can span across N data points (e.g., days or weeks). If the vector is identifiable based on one or more of the preexisting vectors, the system moves to block 212. If the vector is not identifiable, then the system, at block 210, creates a new vector in KVP format. The new vector includes information of the raw event data. At block 212, the system updates the preexisting vector database such that future vectors with similar patterns can be detected based on either the new vector created at block 210, or the vector that was determined to be similar to the preexisting vectors at block 208.

At block 214, the KVPs of the vector are stored in the database. At block 216, a model is also input, in vector form, into the database. The model can be the model created using the method described in life cycle 100 in FIG. 1. For example, as described above, a user may initially log in to a machine at 9 AM. This data, at block 202, can be input into the system. The data can subsequently be tokenized and compared to preexisting vectors at block 204 and 206, respectively. The system can, at block 208, determine whether the vector is similar to preexisting vectors. The determination can be based on a variety of factors such as, day of the week, time of day, the activity of others on the network or in the vicinity, the user's actions while logged on, and others. Based on the several factors, the system may determine that the data indicative of the log-on is or is not identifiable.

Based on the determination, the system can either first make a new vector at block 210 and proceed to block 212 or proceed to block 212 directly. The data representative of the log in can be stored in the database. Further, as described under FIG. 1, a model can be created based on this data to assess the risk and can be automatically reapplied at predetermined intervals. This model can be input into the database and associated with the data representative of the log in. Thus, if the user repeats the behavior multiple times, the same model can be reapplied, and the risk score can diminish. Conversely, if the behavior is an anomaly, the same model can be reapplied, and the risk score can escalate.

Figure 3:
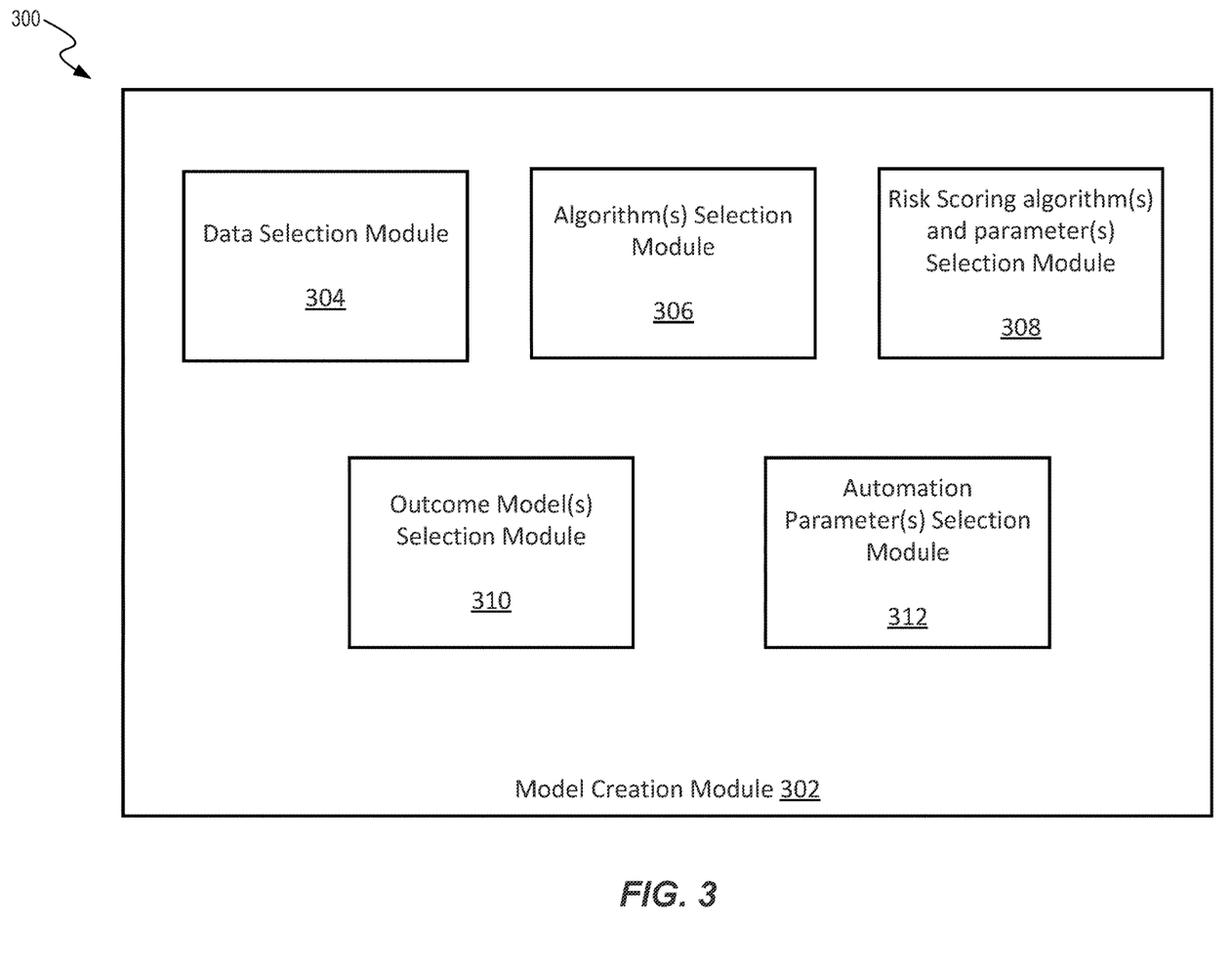
FIG. 3 depicts a functional block diagram of an example module that can be used for model creation.

FIG. 3 depicts a functional block diagram of an example 300 module that can be used for model creation. Model creation module 302 can be used to implement the life cycle 100 in FIG. 1 and method depicted in flowchart 200 of FIG. 2. Model creation module 302 can be implemented on a processor, device, and/or system capable of receiving data (e.g., wirelessly), processing data, accessing memory, and updating the memory. For instance, data selection module 304 can perform the tasks described in FIG. 2. For example, data selection module 304 can receive data from telemetry logs, tokenize the data to form a vector, compare the formed vector with preexisting vector to determine the similarities, and save the formed vector to a database. Similarly, algorithm(s) selection module 306 can select, for example, ML/AI algorithms to be applied to the selected data. Once the algorithms have been selected and the algorithms have been applied to the data, the risk scoring algorithm(s) and parameter(s) selection module 308 assigns a risk score to the data. The result of which are subsequently modeled by the outcome module(s) selection module 310. Lastly, the automation parameter(s) selection module 312 automates the reapplication of the model at a selected interval.

Figure 4:
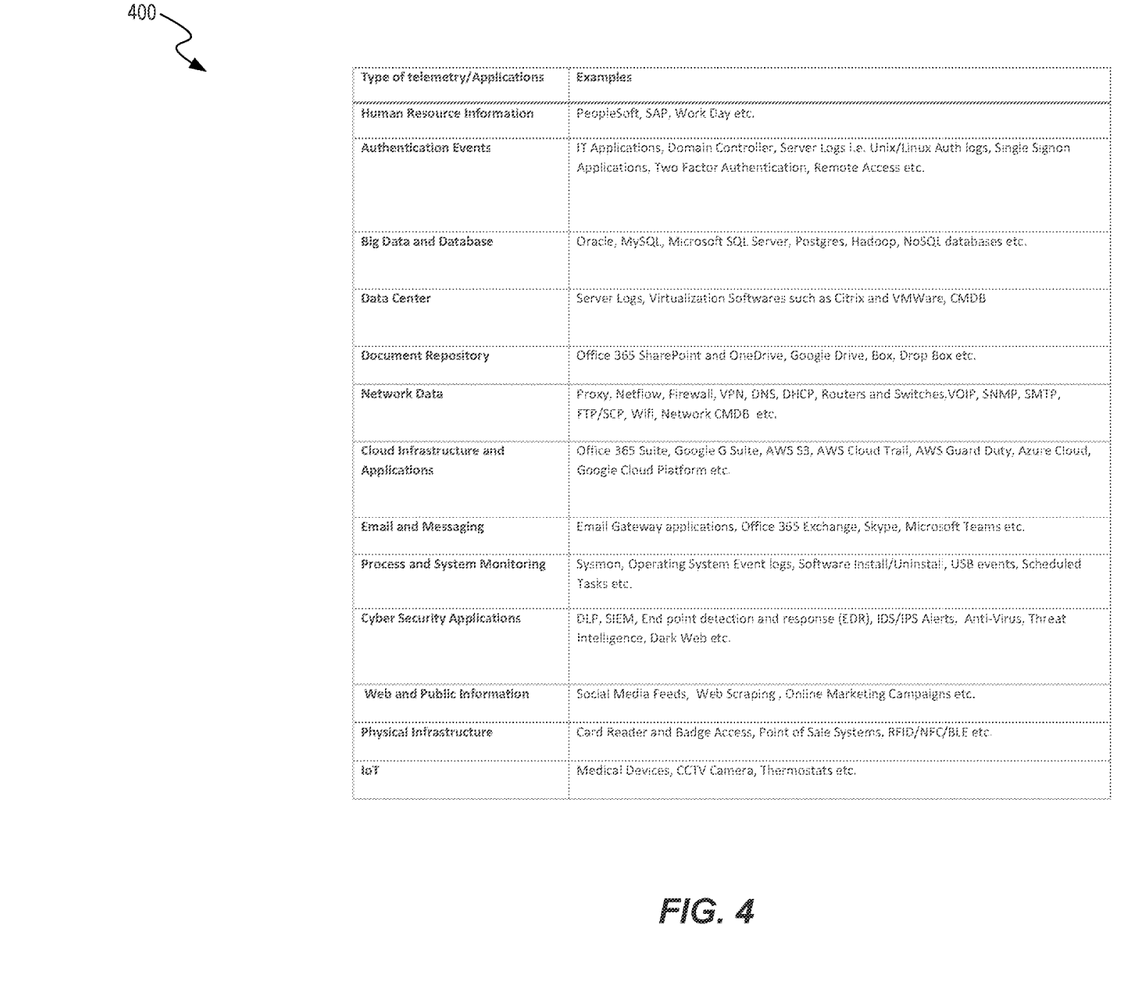
FIG. 4 depicts an inexhaustive table of exemplary data sources.

FIG. 4 depicts a table 400 of exemplary data sources. In one column, the table 400 provides a list of types of telemetry and/or applications that can provide data. The other column provides examples of each type of telemetry and/or applications. For instance, server logs from data centers can be the raw data that is received by the system (e.g., data selection module 304 in FIG. 3). Further, the table 400 shows the variety of sources that data can be received from. For instance, a corporation can include IoT devices such as CCTV cameras and human resource information such as SAP.

Thus, as mentioned above, the different forms of data are converted to key value pairs. Key value pair is a fundamental data representation in computing systems and applications. Key value pair is often in the form of "<attribute name, value>". For example, the table below depicts raw data from a Microsoft Domain Controlled in XML format:

TABLE 1

| Raw Data | |
|---|---|
| Application | Microsoft Domain Controller |
| Format | XML format |
| Raw format sample | -     <Event xmlns="http://schemas.microsoft.com/win/2004/08/events/event"> <br> - <System> <br>   <Provider    Name="Microsoft-Windows-Security-Auditing" Guid="{54849625-5478-4994-A5BA-3E3B0328C30D}" /> <br>   <EventID>4801</EventID> <br>   <Version>0</Version> <br>   <Level>0</Level> <br>   <Task>12551</Task> <br>   <Opcode>0</Opcode> <br>   <Keywords>0x8020000000000000</Keywords> <br>   <TimeCreated SystemTime="2015-09-10T23:47:05.886096408Z" /> <br>   <EventRecordID>237657</EventRecordID> <br>   <Correlation /> <br>   <Execution ProcessID="504" ThreadID="4540" /> <br>   <Channel>Security</Channel> <br>   <Computer>DC01.contoso.local</Computer> <br>   <Security /> <br>   </Systems <br> - <EventData> <br>   <Data   Name="TargetUserSid">S-1-5-21-3457937927-2839227994-823803824-1104</Data> <br>   <Data Name="TargetUserName">dadmin</Data> <br>   <Data Name="TargetDomainName">CONTOSO</Data> <br>   <Data Name="TargetLogonId">0x759a9</Data> <br>   <Data Name="SessionId">3</Data> <br>   </EventData> <br>   </Event> |

As seen in Table 1, the data that is received by the system is in XML format; however, data from other sources and related to the same event can be in another format. Thus, as shown in Table 2, below, the data is converted to KVP:

TABLE 2

| KVP Format | |
|---|---|
| Raw Message | <86>Sep 16 16:31:58 Ii883-172 sshd[11389]: Accepted publickey for root from 172.114.228.116 port 61832 ssh2: RSA SHA256:CB3/hdvSL/uwRtBjv9DSfzVpx5BBbJjnXBZSRm/7Myg |
| Tokenization KV Pair | EventDate = Sep 16 16:31:58 <br> ServerName = Ii883-172 <br> ProcessName = SSHD <br> Event = Accepted publickey <br> Username = root <br> IPAddress = 12.14.28.16 <br> Port = 61832 <br> Authtype = RSA SHA256:CB3/hdvSL/uwRtBjv9DSfzVpx5BBbJjnXBZSRm/7Myg |
| Vector Used for Comparison | %{EventDate}\s %{ServerName}%{ProcessName}%{Event}%{UserName}%{IPAddress}%{Port} %{Authtype} |

In Table 2, the raw message is depicted in KVP format wherein the data points are associated with a feature. For example, Event Date is September 16 and username is root. In this way, the entire data set is tokenized into a vector, which is compared to vector with similar features.

For example, if the event date vector is different from a preexisting event data vector, the system may determine this difference to be anomaly. Conversely, if there are multiple preexisting vectors with the same event date, the system may determine that there isn't an anomaly. The risk score may also be adjusted accordingly. In another example, one or more keys within the KVP vector can be given more weight than the other keys. For instance, a difference in the process name key can elicit a higher risk score than a difference in the server name key.

In some embodiments, the algorithm that is applied to a KVP vector can apply a predetermined threshold to determine whether an anomaly is present. For example, a percentage deviation between a key of the new vector and a key of the preexisting vector can be calculated. For instance, a predetermined threshold for a time feature can be one hour. Thus, in Table 2, if the time of the event (e.g., under Event Date), is different by a few seconds, the system may not detect the anomaly. Alternatively, if the difference is a few hours, the system may detect this deviation as an anomaly.

Figure 5:
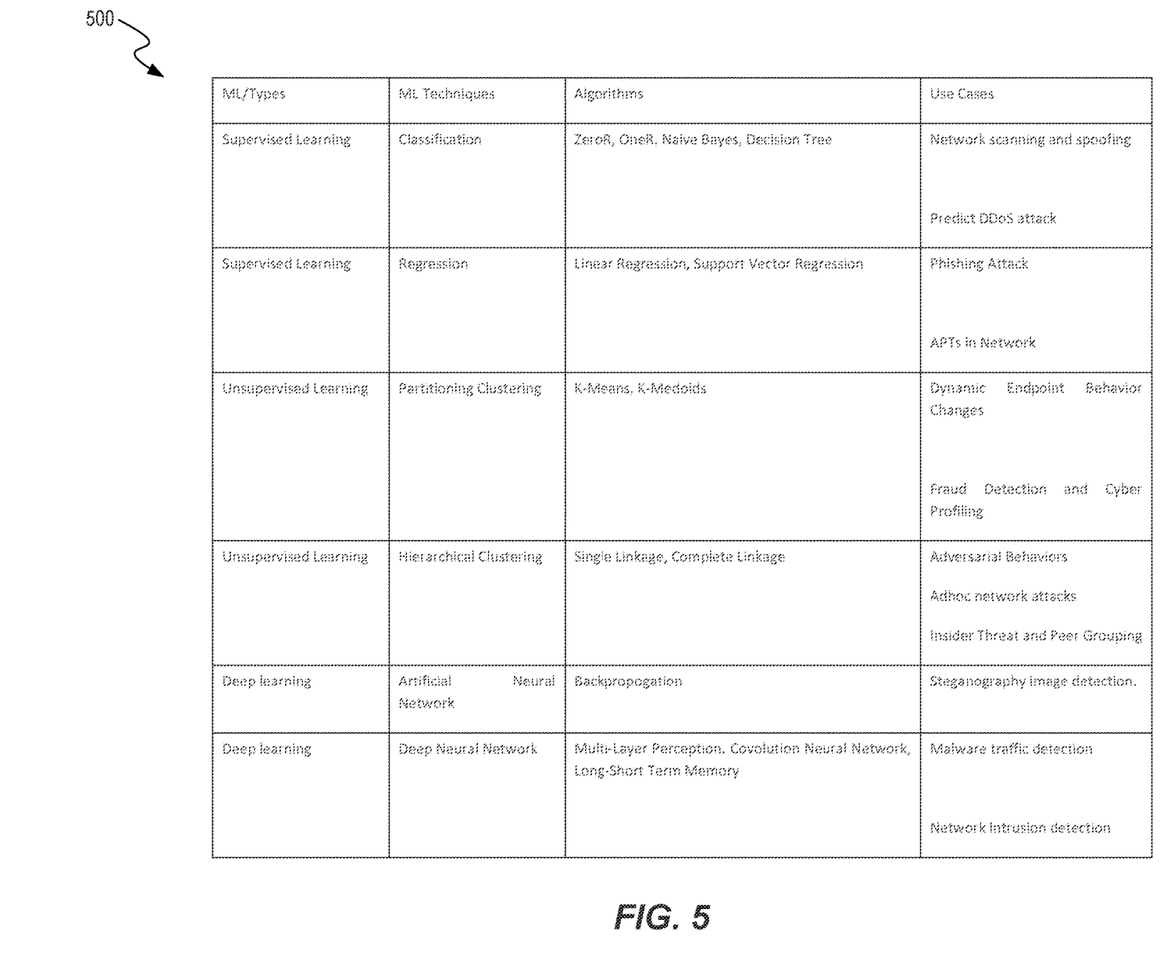
FIG. 5 depicts an inexhaustive table of exemplary data science algorithms and use cases.

FIG. 5 depicts a table 500 of exemplary data science algorithms and use cases. Table 500 provides a non-exhaustive list of algorithms that the system (e.g., Algorithm(s) selection module 306 in FIG. 3) can apply to a tokenized vector. In some cases, the system can apply supervised learning algorithms. Supervised learning algorithms follow, in general, the following steps. First, the training examples are determined and gathered in a database. The training examples can be, for example, the preexisting vectors in the database. In some embodiments, the system can be trained in the development phases (e.g., prior to deployment) with a different set of vectors.

Second, the representation of the features of the input data can be determined. For example, one way to represent the data can be tokenizing the data into KVP format, such that one dimension of the vector is a feature and the other is the value of the feature. Third, the system determines the structure of the learned function and the corresponding learning algorithm. After doing so, the system applies the supervised learning algorithm to the training examples. In some cases, the supervised learning algorithms require the user to determined certain control parameters. For example, the control parameter can be a threshold value for deviation percentage. Lastly, the system determines the accuracy of the learned algorithm and adjusts the function accordingly.

Figure 6:
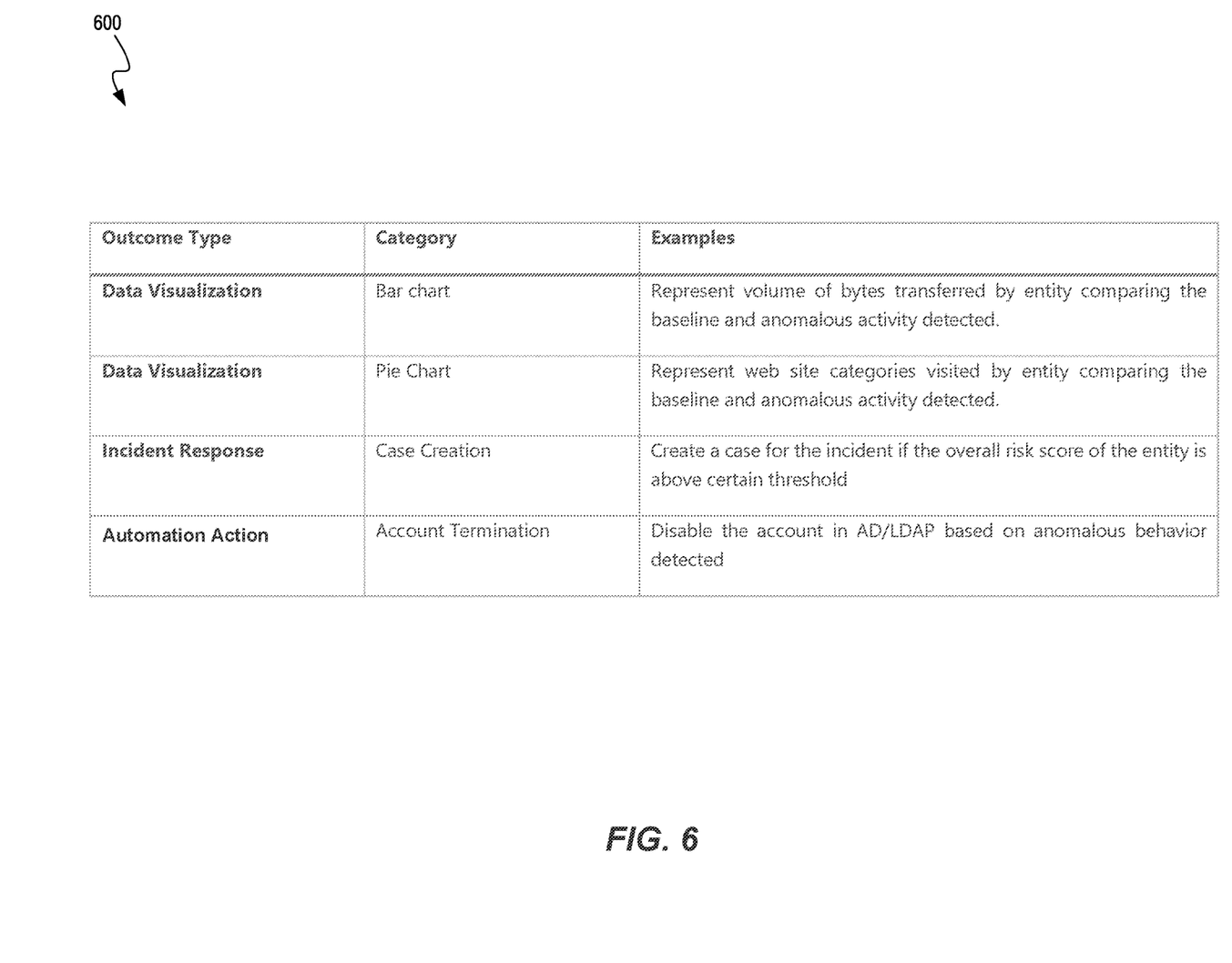
FIG. 6 depicts an inexhaustive table of exemplary outcome types.

FIG. 6 depicts a non-exhaustive table 600 of exemplary outcome types. The outcome types in Table 600 can be the output of, for example, outcome model(s) selection module 310 in FIG. 3. In some embodiments, a bar chart outcome type can be selected. The bar chart can depict the volume of bytes transferred by a potentially malicious entity in comparison to a baseline. For instance, a potentially malicious entity can transfer 100 megabytes per minute, while the baseline can be 1 megabyte per minute. The baseline can be determined by, for example, the activity of other machines in the network or in the vicinity, previous history of the machine being used, or other relevant factors. Given that the rate of transfer is 100× the baseline, a bar chart may best depict that difference in volume of bytes transferred. Thus, allowing an analyst to easily assess the potential risk.

Example System

Figure 7:
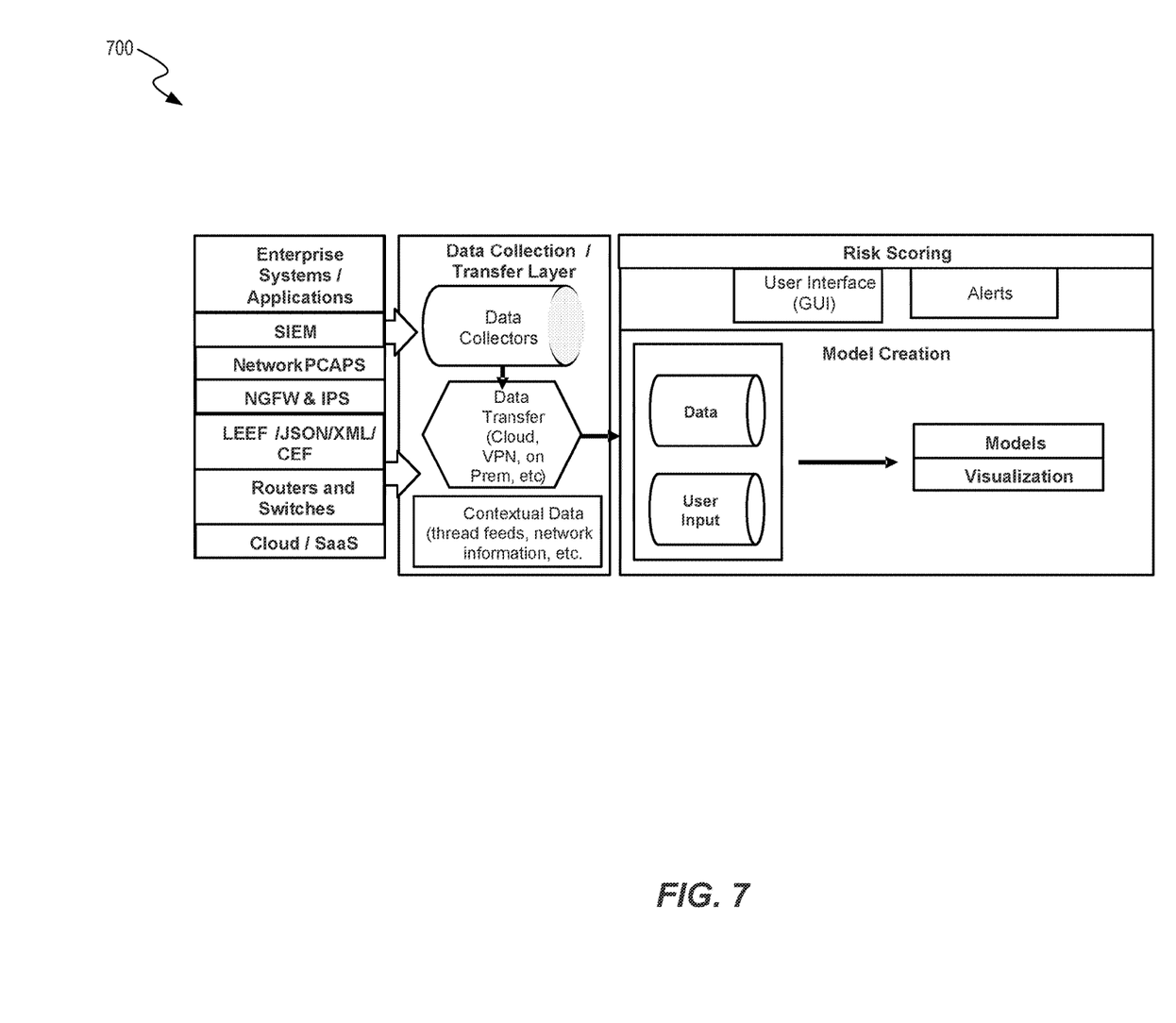
FIG. 7 shows an example of a computing system in which model creation techniques may be performed.

FIG. 7 shows an example of a computing system in which model creation techniques may be performed. As depicted in FIG. 7, several source such as enterprise systems and/or applications, security information and event management (SIEM) sources, and others may generate data during use, that is communicated to a data collection/transfer layer (DCTL). DCTL may include individual functions such a data collection function, a data transfer function, and contextual data collection function. DCTL may also include other functions that provide intelligence data on threats. For example, the intelligence data can be meta data associated with data from a router.

In some embodiments, the data collectors may include a combination of processors and memory such that the processors log data received with time stamps and other environmental variables (e.g., enterprise identity, user identity, security level, etc.) and save the log data in the memory.

In various embodiments, the data transfer mechanism may use open source solutions such as Kafka for data stream management, syslog or Apache Flume for data movement.

The data transfer mechanism may provide the intelligence and data logs to a threat analytics system by storing into a Hadoop storage layer (HSL) or a database. The collected data, which may include a plurality of records. The HSL may also index the data and transform the data. The data transformation may include filtering data, linking relevant data records for the same entity with each other, extracting context of the data and enrichment of the data. In some embodiments, a transformation module may be incorporated within the data transfer mechanism. The transformation module may be configured to perform risk analysis and/or may store the transformed data into the Hadoop file system (HDFS) in the HSL.

The data stored in the HSL may be made available via an interface layer which may be used to view or change the data. A user interface (command line or graphical user interface) may be used for accessing/viewing the data. An alerts module in the interface layer may be used to alert users with system malfunctions or with the anomalies found as described herein. The Alerts module (sometimes called the case management system) may be set to trigger an alert at various levels of issues found in the data or system. The data may also be made available via web access. A representational state transfer application programmer interface (REST API) module may provide access to data for reading or writing purpose using a published API. s A risk scoring (RS) module with near Real Time Alerting may detect threats in the plurality of records stored in the HSL using, for example, the techniques described in the present document. Behavior analytics with techniques such as Machine Learning, entity profiling, dynamic or static Peer Grouping (PG) may also be used.

A model creation (MC) module can receive data and user input to develop a risk scoring model and visualization of the data (e.g., risks). The MC can, for example, receive SIEM data with contextual data from thread feeds and user input which indicates the algorithm to apply, to develop a risk scoring algorithm and a visualization of the data. The models module can include functions to, for example, tokenize the data, applying a KVP, update the matrix, etc. In some embodiments, the MC module can include a reapplication module which is configured to determine whether to reapply the model to data based on, for example, a predetermined schedule.

Example Methodology

Figure 8:
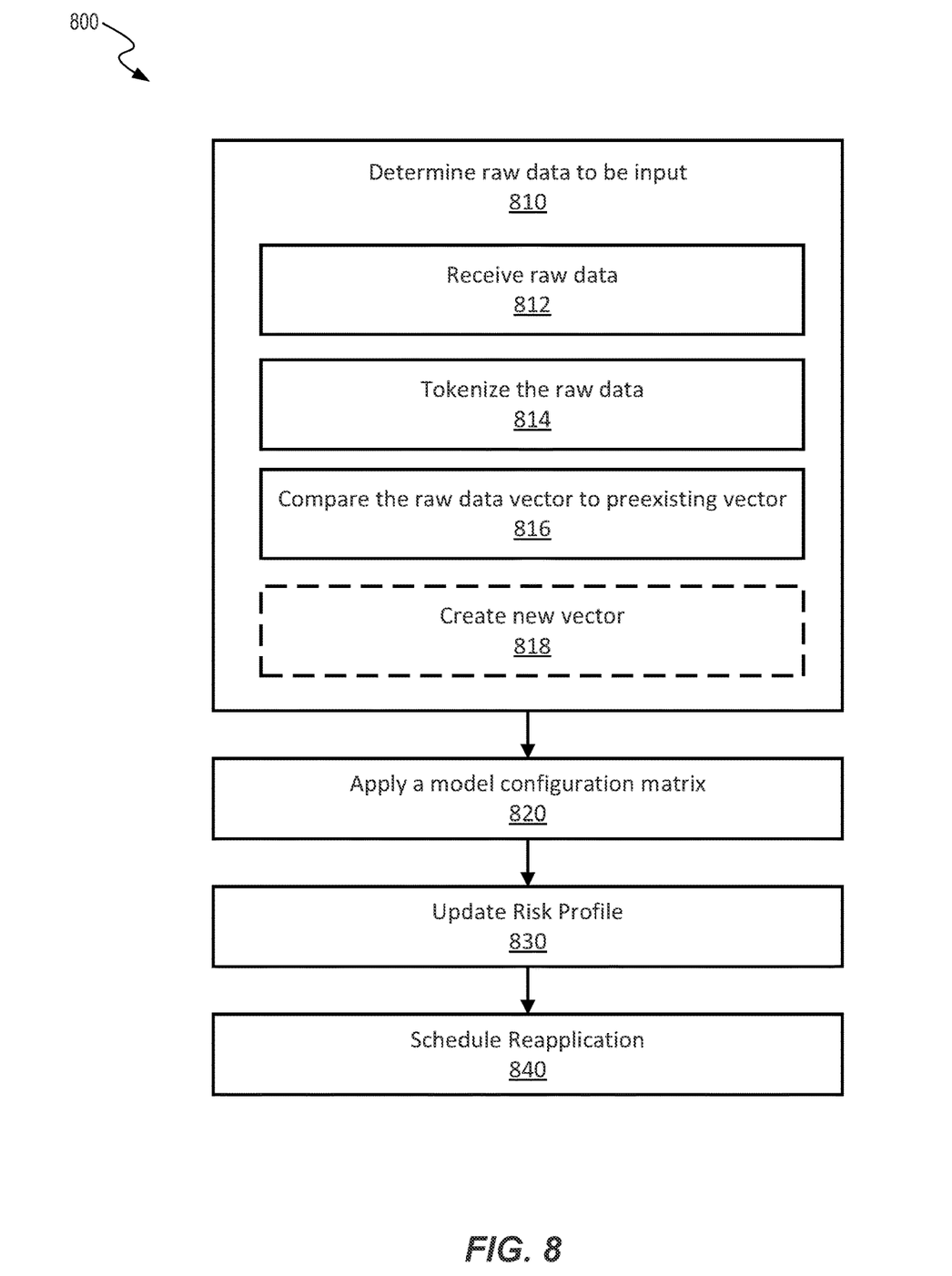
FIG. 8 depicts another flowchart of an exemplary method for model creation.

FIG. 8 depicts another flowchart 800 of an exemplary method for model creation. The method depicted in flowchart 800 can be implemented by a computing device having a processor and/or a a computer readable medium with a processor that is able to execute code which is stored thereon. The method depicted in flowchart 800 can be implemented to create a threat detection model. The method can begin at block 810 by determining raw data to be input into the threat detection model. Doing so can further comprises receiving the raw data, at block 812, from one or more sources such a security system, email gate application, and/or others. The data can subsequently tokenized, at block 814, into a raw data vector. The raw data vector can be in KVP format which includes information such as a feature of the data and/or structure of the data. At block 816, the raw data vector is compared to a preexisting vector. If the comparison indicates that the two vectors are equal, the raw data vector can be stored in a database. Conversely, if the comparison indicates that the two vectors are not equal, a new vector is created, in KVP format, of the unequal data.

At block 820, the method can include applies a model configuration matrix to the new vector. The model configuration matrix can include a vector representation of a threat detection algorithm, the new vector, and a parameter vector. The parameter vector can be representative of a parameter that is used to initialize the threat detection model (e.g., time of day). Further, the parameter can also be included in the initially tokenized vector along with a value associated with the parameter. The threat detection algorithm can include any of a supervised learning algorithm, an unsupervised learning algorithm, a deep learning algorithm, or any combination thereof.

At block 830, the method can include updating a risk profile based on the output from applying the model configuration matrix. The output can be indicative of the similarities between the new vector and the preexisting vector. The risk profile can be directly related to the similarities. Thus, the risk score can be indicative of the level of threat. Moreover, since many algorithms can be applied, the method can include scaling the risk score based on function (1) described above.

At block 840, the method can include scheduling reapplication of the model configuration matrix based on a predetermined rule. The predetermined rule can be a triggering frequency time that is represented by a vector and determined by function (2) described above. Once the model is reapplied to data, the risk profile can be updated to reflect the outcome of the reapplication. In some embodiments, reapplication can include receiving data which indicates a plurality of occurrences of an event represented by the new vector (e.g., opening a laptop at 9 AM), wherein each occurrence of the plurality of occurrences is associated with context data. The context data can include, for example, the time when the events occurred, the IP address, the location, the user, and any such data that can be associated with the event.

Further, for each occurrence of the event, the processor can determine whether the context data is similar to context data of other occurrences of the plurality of occurrences. For instance, the processor can determine whether the time of day was the same, whether it was the same user, etc. Subsequently, the processor can update the risk profile such that the risk profile indicates a lower risk when the context data is similar to the context data of other occurrences or updating the risk profile such that the risk profile indicates a higher risk when the context data is not similar to the context data of other occurrences. In this manner, the risk profile can update for each occurrence of an event.

Computer System and Device Architecture

Figure 9:
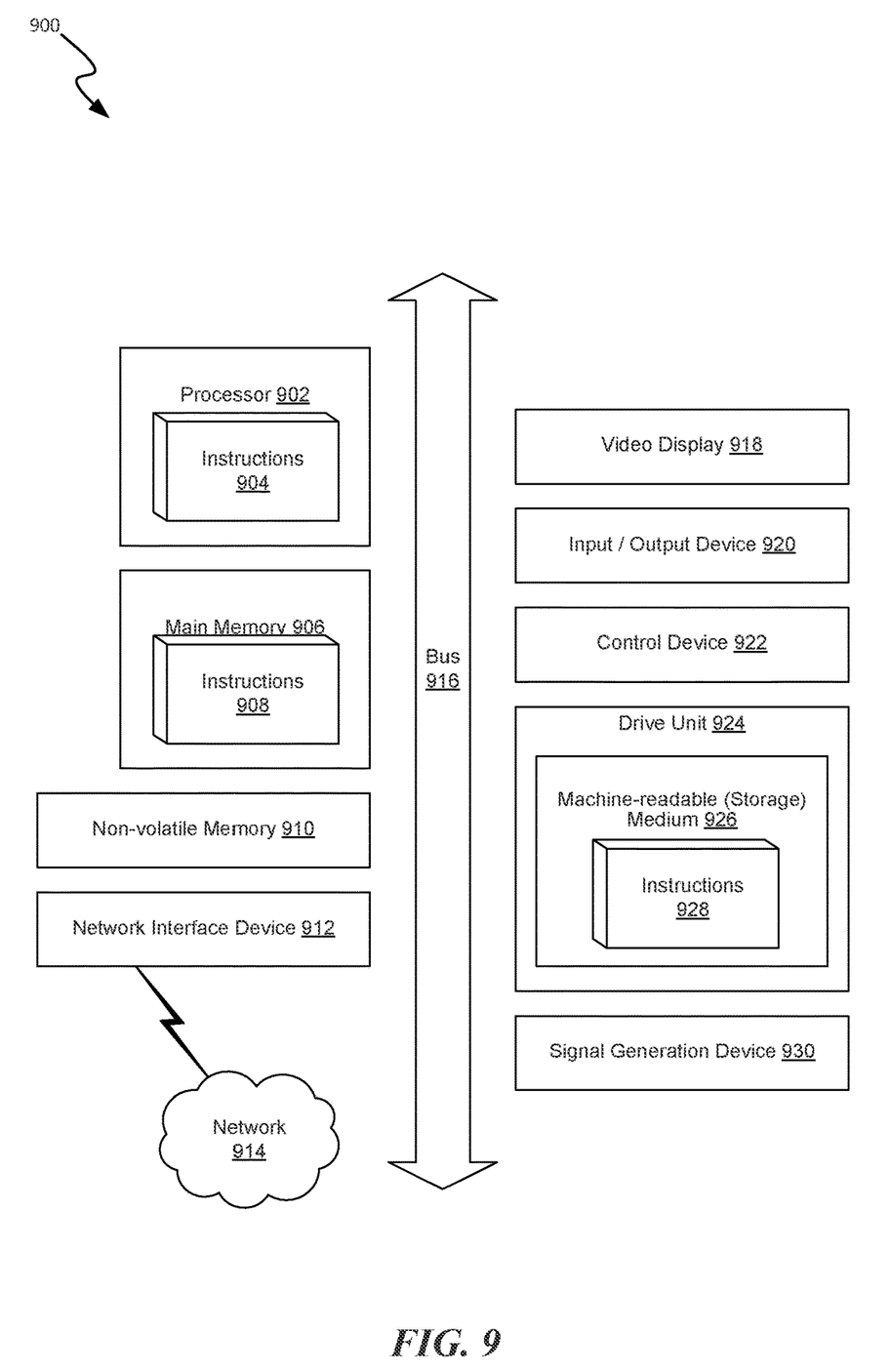
FIG. 9 depicts a high-level block diagram showing an example of a mobile system in which at least some operations related to the techniques introduced here can be implemented.

FIG. 9 is a block diagram illustrating an example of a computing system 900 in which at least some operations described herein can be implemented. For example, some components of the computing system 900 utilized to implement a computing device (e.g., model creation module 302 in FIG. 3).

The computing system 900 may include one or more central processing units (also referred to as "processors") 902, main memory 906, non-volatile memory 910, network adapter 912 (e.g., network interface), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 900 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., ML/AI algorithms and/or risk scoring algorithms) set at various times in various memory and storage devices in a computing device. When read and executed by the one or more processors 902, the instruction(s) cause the computing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the computing system 900 to mediate data in a network 914 with an entity that is external to the computing system 900 through any communication protocol supported by the computing system 900 and the external entity. The network adapter 912 can include a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 912 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

It will be appreciated that the present document describes several techniques for building and maintaining cyber security threat detection models. Using the disclosed techniques, various embodiments may be able to develop cyber security models to protect data and privacy within a network such as a corporate network or a local intranet. Using the disclosed techniques, embodiments are able to determine which raw data is useful for detecting cyber threat. Various techniques for processing the raw data are provided to improve generally the field of computer technology by making computer installations and networks secure. The disclosed technical solutions therefore demonstrate and advancement in the field of computer technology by providing techniques for detecting and isolating threats using a platform that allows for ongoing learning using efficient data models that are amenable to continuous learning based on adaptation of threat models on a continual basis.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for creating a threat detection model, the method comprising:
    determining, by a processor, raw data to be input into the threat detection model, wherein determining the raw data further comprises:
        receiving the raw data;
        tokenizing the raw data into a raw data vector;
        comparing the raw data vector with one or more preexisting vectors, wherein the preexisting vector includes previously identified patterns; and
        upon determining that the raw data vector is not equal to the preexisting vector, creating a new vector, based on the raw data vector, in a key value pair (KVP) format;
    applying, by the processor, a model configuration matrix to the new vector, the model configuration matrix including a vector representation of a threat detection algorithm, the new vector, and a parameter vector;
    updating, by the processor, a risk profile based on an output from the applying of the model configuration matrix, wherein the output is indicative of similarities between the one or more preexisting vectors and the new vector, and wherein the risk profile is indicative of the similarities; and
    scheduling, by the processor, reapplication of the model configuration matrix based on a predetermined rule, wherein reapplication comprises:
        receiving data indicative of a plurality of occurrences of an event represented by the new vector, wherein each occurrence of the plurality of occurrences is associated with context data; and upon each occurrence of the event:
  determining whether the context data is similar to context data of other occurrences of the plurality of occurrences; and
  updating the risk profile such that the risk profile indicates a lower risk when the context data is similar to the context data of other occurrences or updating the risk profile such that the risk profile indicates a higher risk when the context data is not similar to the context data of other occurrences.

2. The method of claim 1, wherein updating the risk profile comprises:
determining a risk score, wherein the risk score is indicative of a level of threat.

3. The method of claim 2 further comprising:
scaling the risk score based on a scale factor represented by $R_{min,max}$, wherein the $R_{min,max}$ is calculated by the following function:

$$R_{min,max} = \sum_{0}^{n} N(f(r_{a1}, r_{a2} \ldots r_{an})).$$

4. The method of claim 3, wherein vector ($r_{a1}$, $r_{a2}$, $r_{a3}$ ... $r_{an}$) is indicative of risk scoring algorithms.

5. The method of claim 1, wherein scheduling reapplication further comprises:
determining a model triggering frequency time, $T(t_1, t_2 \ldots t_n)$, based on the function below, wherein $T(t_1, t_2 \ldots t_n)$ represents intervals in which the model is reapplied:

$$M_a = f(t_i | rta_{s|m}).$$

6. The method of claim 1, wherein the parameter vector is representative of a parameter, and wherein the parameter is information that is used to initialize the threat detection model.

7. The method of claim 6, wherein the new vector includes the parameter and a value associated with the parameter.

8. The method of claim 1, wherein the threat detection algorithm is any of supervised learning algorithm, an unsupervised learning algorithm, a deep learning algorithm, or any combination thereof.

9. The method of claim 1, wherein tokenizing the raw data further comprises:
converting the raw data vector into the KVP format, wherein the converted raw data vector includes a data structure associated with the raw data.

10. The method of claim 1, wherein determining the raw data to be input into the threat detection model further comprises:
upon determining that the raw data vector is equal to the preexisting vector, causing storage of the raw data vector in a database.

11. The method of claim 1 further comprising:
upon the reapplication of the model configuration matrix, updating the risk profile to be indicative of an output of the reapplication.

12. A computing device comprising a processor and a memory, configured to perform operations of:
determining, by the processor, raw data to be input into a threat detection model, wherein determining the raw data further comprises:
  receiving the raw data;
  tokenizing the raw data into a raw data vector;
  comparing the raw data vector with one or more preexisting vectors, wherein the one or more preexisting vectors includes previously identified patterns; and
  upon determining that the raw data vector is not equal to the one or more preexisting vectors, creating a new vector, based on the raw data vector, in a key value pair (KVP) format;
applying, by the processor, a model configuration matrix to the new vector, the model configuration matrix including a vector representation of a threat detection algorithm, the new vector, and a parameter vector;
updating, by the processor, a risk profile based on an output from the applying of the model configuration matrix, wherein the output is indicative of similarities between the one or more preexisting vectors and the new vector, and wherein the risk profile is directly related to the similarities; and
scheduling, by the processor, reapplication of the model configuration matrix based on a predetermined rule, wherein reapplication comprises:
  receiving data indicative of a plurality of occurrences of an event represented by the new vector, wherein each occurrence of the plurality of occurrences is associated with context data; and
  upon each occurrence of the event:
    determining whether the context data is similar to context data of other occurrences of the plurality of occurrences; and
    updating the risk profile such that the risk profile indicates a lower risk when the context data is similar to the context data of other occurrences or updating the risk profile such that the risk profile indicates a higher risk when the context data is not similar to the context data of other occurrences.

13. The computing device of claim 12, wherein the operations further include:
determining a risk score, wherein the risk score is indicative of a level of threat.

14. The computing device of claim 13, wherein the processor is further configured to scale the risk score based on a scale factor represented by $R_{min,max}$, wherein the $R_{min,max}$ is function below:

$$R_{min,max} = \sum_{0}^{n} N(f(r_{a1}, r_{a2} \ldots r_{an})).$$

15. The computing device of claim 12, wherein the operations further include:
upon the reapplication of the model configuration matrix, updating the risk profile to be indicative of an output of the reapplication.

16. A non-transitory computer-readable medium having a processor executable code stored thereon, the code, upon execution by a processor, causing the processor to implement a method comprising:
determining, by a processor, raw data to be input into a threat detection model, wherein determining the raw data further comprises:
  receiving the raw data;
  tokenizing the raw data into a raw data vector;

comparing the raw data vector with one or more preexisting vectors, wherein the one or more preexisting vectors includes previously identified patterns; and upon determining that the raw data vector is not equal to the one or more preexisting vectors, creating a new vector, based on the raw data vector, in a key value pair (KVP) format;

applying, by the processor, a model configuration matrix to the new vector, the model configuration matrix including a vector representation of a threat detection algorithm, the new vector, and a parameter vector;

updating, by the processor, a risk profile based on an output from the applying of the model configuration matrix, wherein the output is indicative of similarities between the one or more preexisting vectors and the new vector, and wherein the risk profile is directly related to the similarities; and scheduling, by the processor, reapplication of the model configuration matrix based on a predetermined rule, wherein reapplication comprises:

receiving data indicative of a plurality of occurrences of an event represented by the new vector, wherein each occurrence of the plurality of occurrences is associated with context data; and upon each occurrence of the event:

determining whether the context data is similar to context data of other occurrences of the plurality of occurrences; and updating the risk profile such that the risk profile indicates a lower risk when the context data is similar to the context data of other occurrences or updating the risk profile such that the risk profile indicates a higher risk when the context data is not similar to the context data of other occurrences.

17. The computer-readable medium of claim 16, wherein the method further comprises:

determining a risk score, wherein the risk score is indicative of a level of threat.

18. The computer-readable medium of claim 17, wherein the processor executable code further configures the processor to scale the risk score based on a scale factor represented by $R_{min,max}$ and calculated by applying the function below:

$$R_{min,max} = \sum_0^n N(f(r_{a1}, r_{a2} \ldots r_{an})).$$

19. The computer-readable medium of claim 16, wherein the method further includes:

upon the reapplication of the model configuration matrix, updating the risk profile to be indicative of an output of the reapplication.

20. The computer-readable medium of claim 16, wherein the one or more preexisting vectors is stored within the computer-readable medium.

* * * * *